United States Patent
Long et al.

(10) Patent No.: US 10,729,129 B2
(45) Date of Patent: Aug. 4, 2020

(54) STABLE, GLUFOSINATE-CONTAINING HERBICIDAL COMPOSITIONS

(71) Applicant: BASF SE, Ludwigshafen am Rhein (DE)

(72) Inventors: Melvin Long, Cincinnati, OH (US); Thomas J. McAlpin, Cincinnati, OH (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/099,842

(22) PCT Filed: May 9, 2017

(86) PCT No.: PCT/US2017/031774
§ 371 (c)(1),
(2) Date: Nov. 8, 2018

(87) PCT Pub. No.: WO2017/196856
PCT Pub. Date: Nov. 16, 2017

(65) Prior Publication Data
US 2019/0110469 A1   Apr. 18, 2019

Related U.S. Application Data

(60) Provisional application No. 62/335,231, filed on May 12, 2016.

(51) Int. Cl.
*A01N 25/30* (2006.01)
*A01N 57/20* (2006.01)

(52) U.S. Cl.
CPC ............. *A01N 25/30* (2013.01); *A01N 57/20* (2013.01)

(58) Field of Classification Search
None
See application file for complete search history.

(56) References Cited

U.S. PATENT DOCUMENTS

2005/0266995 A1   12/2005   Frisch et al.
2010/0022392 A1   1/2010   Long

OTHER PUBLICATIONS

International Search Report and Written Opinion for International Application No. PCT/US2017/031774, dated Jun. 14, 2017, 8 pages.

*Primary Examiner* — Alton N Pryor
(74) *Attorney, Agent, or Firm* — Armstrong Teasdale LLP

(57) ABSTRACT

A liquid herbicidal composition free of alkyl polyglucoside includes glufosinate and/or a salt thereof, an alkyl ether sulfate or a salt thereof, a hydrotrope; a polycarboxylate having a weight average molecular weight ranging from greater than or equal to 1,000 g/mol to less than 70,000 g/mol, and water. The alkyl ether sulfate is according to the average formula (I): $R-(OCH_2CH_2)_n-OSO_4$ (I), wherein R is linear or branched alkyl group having from 8 to 18 carbon atoms and wherein the subscript n ranges from 1 to 10.

20 Claims, No Drawings

STABLE, GLUFOSINATE-CONTAINING HERBICIDAL COMPOSITIONS

CROSS REFERENCE TO RELATED APPLICATIONS

This application is the national stage entry of PCT/US2017/031774, filed on May 9, 2017, which claims the benefit of priority to U.S. Provisional Application No. 62/335,231, filed May 12, 2016, the content of which are incorporated in their entirety herein by reference.

BACKGROUND OF THE INVENTION

1. Field of the Invention

The subject invention generally relates to herbicidal compositions, and more specifically to stable, glufosinate-containing herbicidal compositions.

2. Description of the Prior Art

Glufosinate, and/or salts thereof, have been used for many years as the biologically active component of aqueous herbicidal compositions for use as crop protectants. In these aqueous herbicidal compositions, alkyl polyglucoside surfactants are typically added in an amount of 1-15% by weight to increase the stability of such aqueous herbicidal compositions including high concentrations of glufosinate or glufosinate salts.

However, alkyl polyglucoside surfactants added to such aqueous herbicidal compositions at such levels can increase undesirable foaming characteristics of the glufosinate. In addition, these alkyl polyglucoside surfactants can increase the viscosity of such formulations, which is generally undesirable from a handling perspective.

SUMMARY OF THE INVENTION AND ADVANTAGES

The subject application provides herbicidal compositions free of alkyl polyglucoside.

More particularly, the herbicidal composition is free of alkyl polyglucoside and comprises: glufosinate and/or a salt thereof; an alkyl ether sulfate, or a salt thereof, wherein the alkyl ether sulfate is according to the average formula (I): R—(OCH$_2$CH$_2$)$_n$—OSO$_4$ (I), wherein R is linear or branched alkyl group having from 8 to 18 carbon atoms and wherein the subscript n ranges from 1 to 10; a hydrotrope; a polycarboxylate having a weight average molecular weight ranging from greater than or equal to 1,000 g/mol to less than 70,000 g/mol; and water.

The aqueous herbicidal compositions including high concentrations of glufosinate and/or salts thereof have stability without the need for alkyl polyglucoside surfactants and have low viscosities for handling.

DETAILED DESCRIPTION OF THE INVENTION

In the present specification, unless otherwise provided, the amounts of the respective components are provided as weight amounts. In addition, the molecular weights referred to herein are weight-average ($M_w$) or number-average ($M_n$) molecular weights and can be calculated by nuclear magnetic resonance ("NMR") or gel permeation chromatography ("GPC"). In certain embodiments, the weight-average ($M_w$) or number-average ($M_n$) molecular weights and can be calculated by nuclear magnetic resonance ("NMR") or gel permeation chromatography ("GPC") using a calibration curve based on mono-dispersed polystyrene standards, and described in grams/mole (g/mol, or Daltons)).

The subject application refers to stable herbicidal compositions.

The term "stable", as used herein, is intended to refer to the compositions that exist in a substantially continuous single phase. An unstable composition, by contrast, does not exist in a substantially continuous single phase. For example, an unstable composition may exhibit varying degrees of phase separations.

In certain embodiments of the subject application, the herbicidal composition is free of alkyl polyglucoside. The term "free of alkyl polyglucoside", as used herein, refers to herbicidal compositions wherein alkyl polyglucosides are not intentionally added to the herbicidal composition. However, the herbicidal compositions of the subject application may include residual amounts of alkyl polyglucoside, such as in an amount of 1 part by weight or less per 100 parts by weight of the herbicidal composition.

In certain embodiments, the herbicidal composition of the subject application, which is free from alkyl polyglucoside, includes glufosinate (and/or a salt of glufosinate), an alkyl ether sulfate, a polycarboxylate, a hydrotrope, and water.

Glufosinate and/or a Salt Thereof

The herbicidal composition of the subject application includes glufosinate and/or a salt thereof as its water-soluble herbicidal component. The term "glufosinate", as defined in the subject application, refers to (RS)-2-amino-4-(hydroxyl (methyl)phosphonoyl)butanoic acid, and specifically is intended to include either stereoisomer individually or mixtures thereof (in any relative weight or number ratios), particularly the racemic.

Suitable salts defining the salts of glufosinate may be ammonium, sodium, potassium, alkyl amine, and combinations thereof. Suitable alkyl amines include diethylamine and triethylamine.

Ammonium salts that can be used in the subject application have N(R)$_4^+$ cations wherein R groups, identical or different, represent a hydrogen atom or a linear or non linear, saturated or unsaturated C$_1$-C$_6$ hydrocarbon group optionally substituted by a hydroxyl group, for example isopropylamine salts; sulphonium salts; said salts being present alone or in a combination, and mixtures or associations thereof. Ammonium salts that can in particular be cited include salts obtained from secondary or primary amines such as isopropylamine (IPA), dimethylamine, diamines such as ethylenediamine, or alkanolamines such as monoethanolamine (MEA). Trimethylsulphonium is a suitable sulphonium salt. Another exemplary glufosinate salt is ammonium salt DL-phosphinothricin ((±)-Ammonium 2-amino-4-(methylphosphinato)butanoate), sometimes simply referred to as glufosinate ammonium.

In certain embodiments, the water-soluble herbicidal component comprises, consists of, or consists essentially of glufosinate and/or a salt thereof. In certain of these embodiments, the glufosinate and/or a salt thereof is present in an amount ranging from 10 to 30 percent by weight of the aqueous herbicidal composition, such as from 10 to 15 percent by weight, such as from 15 to 20 percent by weight, such as from 20 to 25 percent by weight, such as from 25 to 30 percent by weight, such as from 10 to 20 percent by weight, such as from 2.0 to 30 percent by weight, such as from 22 to 26 percent by weight.

Alkyl Ether Sulfate

The herbicidal composition of the subject application also includes an alkyl ether sulfate, or a salt thereof.

In certain embodiments, the alkyl ether sulfate is according to the average general formula (I): R—(OCH$_2$CH$_2$)$_n$—OSO$_4$ (I), wherein R is linear or branched alkyl group having from 8 to 18 carbon atoms and wherein the subscript n is from 1-10.

In certain embodiments, the salt form of the alkyl ether sulfate according to general formula (I) is utilized alone or in combination with the alkyl ether sulfate of general formula (I). In certain embodiments, the sodium salt or potassium salt of the alkyl ether sulfate according to the average general formula (I) is utilized alone or in combination with the alkyl ether sulfate of general formula (I) (i.e., the sodium salt according to the general formula (II): R—(OCH$_2$CH$_2$)$_n$—OSO$_3^-$Na$^+$ (II); or the potassium salt according to the general formula (III):R—(OCH$_2$CH$_2$)$_n$—OSO$_3^-$K$^+$ (III), may be used alone or in combination with the alkyl ether sulfate according to general formula (I)).

In certain embodiments, the salt of alkyl ether sulfate is sodium lauryl sulfate and is according to the average formula (IV): CH$_3$(CH$_2$)$_{10}$CH$_2$(OCH$_7$CH$_2$)$_n$,OSO$_3^-$Na$^+$(III), wherein the subscript n' is from 2-3.

In certain embodiments, an alkyl ether sulfate of general formula (I) may be utilized, alone or in combination with its associated salt form or forms. In further embodiments, a combination of two or more different alkyl ether sulfates of general formula (I), alone or in combination with their associated salt form or forms, may be utilized.

In certain embodiments, the alkyl ether sulfate, or associated salt thereof (in any of the forms described above), and including any mixtures thereof, is present in the herbicidal composition in an amount ranging from 20 to 30%, such as from 20 to 25%, such as from 25 to 30%, such as from 22 to 26%, such as 24%, by weight based on the total weight of the herbicidal composition.

Polycarboxylate

The polycarboxylate is a polymer (including oligomers) comprising units that have carboxylic moieties. Such polymers comprise of course more than two carboxylic moieties. They typically comprise more than 10 carboxylic moieties. The number of carboxylic moieties varies with the molecular weight.

In the present application, carboxylic moieties encompass various forms such as the acid form (—COOH, i.e. a carboxylic acid group), the salt form (—COO$^-$X$^+$, where X$^+$ is a counter ion, i.e., a carboxylate group), and the condensed form (—COOCO, i.e., an anhydride group). In the polycarboxylate, several forms of the carboxylic moieties can co-exist. For example an acidic form and a salt form can co-exist, the different amounts thereof varying upon varying the pH and/or performing partial neutralization of the acid with a basic compound to form a salt. For example all or a part of the carboxylic moieties are in a salt form with sodium and/or potassium cations. Condensed anhydride forms can co-exist with acidic and/or salt forms (different amounts thereof can also vary with the pH and/or with performing neutralization).

The polycarboxylate is typically a polymer having a polymeric backbone and carboxylic side moieties. The carboxylic side moieties are typically in acid form and/or in a salt form, and/or in a condensed anhydride form. The polymeric backbone is preferably a hydrocarbon chain. Such a backbone can be obtained by polymerizing ethylenically unsaturated monomers, such as olefin monomers, vinyl monomers, acrylic monomers, methacrylic monomers, acrylamido monomers, methacrylamide monomers.

The carboxylic side moieties can be obtained by polymerizing monomers comprising a carboxylic moiety and a polymerizable group such as an ethylenic unsaturation, for example acrylic monomers or methacrylic monomers, or by copolymerizing such monomers with non-carboxylic monomers. The carboxylic side moieties can also be obtained by chemically modifying side groups of a polymer or copolymer. For example carboxylic moieties can be obtained by hydrolyzing ester groups. Such a hydrolysis can be total or partial. Units corresponding to (meth)acrylic acid units or a salt thereof can be for example obtained by hydrolyzing ethyl or tertiobutyl (meth)acrylic units.

The polycarboxylate can be for example obtained by polymerizing or copolymerizing the following monomers: ethylenically unsaturated mono-carboxylic acids, in acid and/or salt form; ethylenically unsaturated di-carboxylic acids, in acid and/or salt form; ethylenically unsaturated anhydrides; and mixtures or associations thereof.

Examples of such monomers include acrylic acid, methacrylic acid, α-ethacrylic acid, β,β-dimethylacrylic acid, methylenemalonic acid, vinylacetic acid, allylacetic acid, ethylidineacetic acid, propylidineacetic acid, crotonic acid, maleic acid, maleic anhydride, fumaric acid, itaconic acid, citraconic acid, mesaconic acid, and salt forms thereof, for example sodium and/or potassium salts thereof.

Non-carboxylic monomers that can be copolymerized include, for example, acrylamide, vinyl alcohol, C$_1$-C$_4$ alkyl esters of acrylic acid and of methacrylic acid, C$_1$-C$_4$ hydroxyalkyl esters of acrylic acid and of methacrylic acid, especially ethylene glycol and propylene glycol acrylate and methacrylate, polyalkoxylated esters of acrylic acid and of methacrylic acid, especially the polyethylene glycol and polypropylene glycol esters, esters of acrylic acid or of methacrylic acid and of polyethylene glycol or polypropylene glycol mono(C$_1$-C$_{25}$)alkyl ethers, vinyl acetate, vinylpyrrolidone and methyl vinyl ether.

In certain embodiments, the polycarboxylates that can be used can be at least partially cross-linked, for example by reacting the side carboxylic moieties with a cross linking agent comprising at least two groups than can react with the carboxylic moieties, such as hydroxyl groups. For example, one can use polycarboxylates partially cross linked with ethylene glycol.

If the polycarboxylate is a copolymer, it is preferred that the non-carboxylic units and/or the amounts thereof are such that the polycarboxylate be water-soluble.

In certain embodiments, the polycarboxylate can be substantially free (less than 10 mol %, such as less than 5 mol %, such as less than 1 mol %) of: units bearing sulfate or sulfonate groups (such as units deriving from AMPS monomer); cationic units, and/or hydrophobic units such as alkylesters of (meth)acrylic acid, styrene or di-isobutylene, vinyl acetate.

In certain embodiments, the polycarboxylate polymer comprises at least 50 mol %, such as at least 75 mol %, such as at least 90 mol %, such as at least 95 mol % of units corresponding to the following monomers: ethylenically unsaturated mono-carboxylic acids, in acid and/or salt form; ethylenically unsaturated di-carboxylic acids, in acid and/or salt form; ethylenically unsaturated anhydrides; and mixtures or associations thereof.

In certain embodiments, the polycarboxylate polymer is a polymer derived from (meth)acrylic acid, in acid or salt form.

In certain embodiments, the polycarboxylate polymer is a copolymer of (meth)acrylic acid and maleic acid. In certain of these embodiments, the copolymer of (meth)acrylic acid and maleic acid includes at least 50 mol %, such as at least 75 mol %, such as at least 90 mol %, such as at least 95 mol % of units corresponding to acrylic acid and/or methacrylic acid (i.e., (meth)acrylic acid), in acid or salt form, with the remainder of the units being maleic acid. The polycarboxylate can be, for example, sodium polyacrylate or potassium polyacrylate.

In certain embodiments, the polycarboxylate polymer is a copolymer of (meth)acrylic acid and maleic anhydride. In certain of these embodiments, the copolymer of (meth)acrylic acid and maleic anhydride includes at least 50 mol %, such as at least 75 mol %, such as at least 90 mol %, such as at least 95 mol % of units corresponding to acrylic acid and/or methacrylic acid (i.e., (meth)acrylic acid), in acid or salt form, with the remainder of the units being maleic anhydride. The polycarboxylate can be, for example, sodium polyacrylate or potassium polyacrylate.

In certain embodiment, the polycarboxylate polymer is a copolymer of (meth)acrylic acid, maleic acid and maleic anhydride. In certain of these embodiments, the copolymer of (meth)acrylic acid and maleic acid and maleic anhydride includes at least 50 mol %, such as at least 75 mol %, such as at least 90 mol %, such as at least 95 mol % of units corresponding to acrylic acid and/or methacrylic acid (i.e., (meth)acrylic acid), in acid or salt form, with the remainder of the units being maleic acid or maleic anhydride. The polycarboxylate can be, for example, sodium polyacrylate or potassium polyacrylate.

The polycarboxylate polymer, in any of the embodiments above, has a weight average molecular weight (Mw) of less than 70,000 g/mol, or from higher than 1,000 g/mol, as measured by nuclear magnetic resonance (NMR) or by gas phase chromatography (GPC) previously calibrated using a calibration curve based on mono-dispersed polystyrene standards, and described in grams/mole (g/mol, or Daltons)). In certain embodiments the polycarboxylate polymer has a weight average molecular weight (Mw) ranging from greater than or equal to 1,000 g/mol to less than 70,000 g/mol, such as from 1,500 to 50,000 g/mol, such as from 1,700 to 20,000 g/mol, such as from 2,000 to 15,000 g/mol, such as from 3,000 to 6,000 g/mol, again as measured by NMR or GPC.

In certain embodiments, the polycarboxylate polymer is a polymer of acrylic acid having weight average molecular weight (Mw) as measured by NMR or GPC of 15,000 g/mol.

In still further embodiments, the polycarboxylate polymer is a copolymer of (meth)acrylic acid and maleic acid, or a copolymer of (meth)acrylic acid and maleic anhydride, or a copolymer of (meth)acrylic acid and maleic acid and maleic anhydride, with the polycarboxylate having a weight average molecular weight (Mw) as measured by NMR or GPC of 20,000 g/mol.

Still further, the polycarboxylate polymer, in any form as described above, is present in the herbicidal composition in an amount ranging from 0.1 to 3.0 weight percent, such as from 0.1 to 1.0 weight percent, such as from 1.0 to 2.0 weight percent, such as from 2.0 to 3.0 weight percent, such as from 0.8 to 1.2 weight percent, of the total weight of the herbicidal composition.

Hydrotrope

The herbicidal composition of the subject application also includes a hydrotrope. A hydrotrope, as defined herein, refers to a compound that solubilizes hydrophobic compounds, such as the alkyl ether sulfate as described above, in aqueous solutions. Stated another way, a hydrotrope, as defined herein, is a substance that improves the solubility of such compounds in water, particularly those systems containing high levels of builders or alkalinity. Typically, the hydrotrope of the subject application includes a hydrophilic part and a hydrophobic part, like surfactants, but are distinguished from surfactants because the hydrophobic part is generally too small to cause spontaneous self-aggregation. Hydrotropes are generally considered a special class of couplers requiring relatively low levels for solubilization of surfactants. Builders or other electrolytes will depress cloud point temperature or solubility of surfactants in aqueous systems. Hydrotropes can be used to adjust the cloud point of the formulation. A higher concentration of hydrotrope generally leads to higher cloud points. The hydrotrope of the subject application does not generally contribute to, or detract from, the performance of surfactant or builder in the herbicidal composition of the subject application.

Suitable hydrotropes for use in the herbicidal composition of the subject application include, in certain embodiments, aryl sulfonic acid or a salt thereof.

Suitable forms of aryl sulfonic acid include xylene sulfonic acid (ortho, meta and/or para forms), toluene sulfonic acid, cumene sulfonic acid, and benzene sulfonic acid.

Suitable salt forms of xylene sulfonic acid include sodium xylene sulfonate (ortho, meta and/or para forms), calcium xylene sulfonate (ortho, meta and/or para forms), potassium xylene sulfonate (ortho, meta and/or para forms), and ammonium xylene sulfonate (ortho, meta and/or para forms).

Suitable salt forms of toluene sulfonic acid include sodium toluene sulfonate and potassium toluene sulfonate.

Suitable salt forms of cumene sulfonic acid include sodium cumene sulfonate and ammonium cumene sulfonate.

Suitable salt forms of benzene sulfonic acid include sodium benzene sulfonate.

In certain embodiments, a single hydrotrope from the above list may be utilized, alone or in combination with its associated salt form or forms. In further embodiments, a combination of two or more hydrotropes from the above list, alone or in combination with their associated salt form or forms, may be utilized.

One particularly suitable hydrotrope is sodium xylene sulfonate, sold under the tradename Pilot® SXS-40 from Pilot Chemical Company of Cincinnati, Ohio.

In certain embodiments, the hydrotropes are included in the herbicidal composition of the subject application in amounts ranging from 1 to 10%, such as from 2 to 5%, such as 3.00%, by weight based on the total weight of the herbicidal composition. Still further, suitable hydrotropes that can be used in combination with any of the above aryl sulfonic acids, or salts thereof, are phosphate-ester based products, alkyl naphthalene sulfonic acids and derivatives, toluene/benzene/cumene/xylene sulfonic acids and derivatives.

Water

The herbicidal composition of the subject application also includes water.

In certain embodiments, the amount of water in the herbicidal composition ranges from 10 to 60%, such as from 10 to 20%, such as from 20 to 30%, such as from 30 to 40%, such as from 40 to 50%, such as from 50 to 60%, by weight based on the total weight of the herbicidal composition. The herbicidal composition can be further diluted with water in a spray tank prior to application at a dilution rate of from 1:50 (one part of herbicidal formulation to 50 parts water) to 1:250 (one part of herbicidal formulation to 250 parts of water).

Solvents Other Than Water

The solvents other than water can be, for example, glycols such as a water-miscible glycol ether; a water-miscible alcohol; a water-miscible ketone; a water-miscible aldehyde; a water-miscible acetate; and any combination (mixture or association) thereof.

Suitable water-miscible glycol ethers that can be used include dipropylene glycol, alkylene glycol monoalkyldialkyl ethers such as propylene glycol methyl ether (Dowanol PM, available from the Dow Chemical Company of Midland, Mich.), propylene glycol monomethyl ether, propylene glycol monoethyl ether, ethylene glycol monomethyl ether and ethylene glycol monoethyl ether. Suitable water-miscible glycols that can be used include dipropylene glycol, propylene glycol, hexylene glycol, ethylene glycol, neopentyl glycol and glycerol. Suitable water-miscible ketones that can be used include acetophenone, gamma butyrolactone, N-methyl pyrrolidone. Suitable water-miscible alcohols that can be used include furfuryl alcohol, tetrahydrofurfuryl alcohol and methoxy methyl butanol. Suitable water-miscible esters that can be used include propylene carbonate. Suitable water-miscible acetates that can be used include ethyleneglycol monoacetate. Still further, other solvents that can be used include dimethyl formamide; hexadiols; and glycol ether amines.

If included, these solvents other than water may be included in the herbicidal composition in an amount ranging from 0.1 to 15.0, %, such as from 0.1 to 1.0%, %, such as from 1.0 to 5.0%, such as from 5.0 to 10.0%, %, such as from 10 to 15%, weight percent based on the total weight of the herbicidal composition. In particular, the Dowanol PM or similar alkylene glycol monoalkyldialkyl ethers, when included, may be used in a range of 0.1 to 3.0% by weight based upon the total weight of the herbicidal composition. Still further, the dipropylene glycol, or similar water-miscible glycols, when included, may be used in a range of 5.0 to 15.0% by weight based upon the total weight of the herbicidal composition.

Optional Additional Water-Soluble Herbicidal Components

The herbicidal composition of the subject application may optionally include other water-soluble herbicidal component in combination with glufosinate and/or its salts thereof. Suitable examples of other water-soluble herbicidal components include, but are not limited to, aminophosphate or aminophosphonate salts.

Advantageously, if utilized, the aminophosphate or aminophosphonate salt comprises at least 10% by weight, preferably at least 50%, preferably at least 90%, of isopropylammoniumaminophosphate or aminophosphonate salt, such as isopropylatnmonium glyphosate, or of potassium aminophosphate or aminophosphonate salt, such as potassium glyphosate salt. The salt can be formed upon preparation of the composition by adding whole or a part of the total aminophosphate or aminophosphonate in acid form, and neutralizing to form the salt with the corresponding amount of base (such as KOH, amine etc). If only a part has been introduced and prepared, then the remaining can be added wholly or as parts.

The optional additional water-soluble herbicidal components, if present, may be present in the herbicidal composition in amounts ranging from 10 to 30 percent by weight, such as from 10 to 15 percent by weight, such as from 15 to 20 percent by weight, such as from 20 to 25 percent by weight, such as from 25 to 30 percent by weight, such as from 10 to 20 percent by weight, such as from 20 to 30 percent by weight, such as from 22 to 26 percent by weight, of the total weight of the herbicidal composition.

In still further embodiments, the combination of glufosinate and/or its salts thereof and the additional water-soluble herbicidal components, if present, may be presemt in the herbicidal composition in amounts ranging from 20 to 60 weight percent, such as from 20 to 25 weight percent, such as from 25 to 30 weight percent, such as from 30 to 35 weight percent, such as from 35 to 40 weight percent, such as from 40 to 45 weight percent, such as from 45 to 50 weight percent, such as from 50 to 55 weight percent, such as from 55 to 60 weight percent, of the total weight of the herbicidal composition.

Further Components

Further components could include wetting agents, dispersing agents, emulsifiers, penetrants, preservatives, antifreeze agents, evaporation inhibitors and humectants, suspending aids, thickeners, anti-drift agents, deposition agents, fillers, carriers, colorants antioxidants, and antifoaming agents.

If included, these further components may be included in the herbicidal composition in an amount ranging from 0.1 to 5.0 weight percent based on the total weight of the herbicidal composition.

The following examples are intended to illustrate the invention and are not to be viewed in any way as limiting to the scope of the invention.

EXAMPLES

In the Examples, various formulations of herbicidal compositions were evaluated to determine whether they produced a stable formulation. The procedure for forming the various herbicidal compositions described in Tables 1-4 (all MW refer to weight average molecular weights (as measured by nuclear magnetic resonance (NMR) or gas phase chromatography (GPC) previously calibrated using a calibration curve based on mono-dispersed polystyrene standards, and described in grams/mole (g/mol, or Daltons)) below was generally as follows:

Procedure

1. Add water to mixing vessel and started mixing using stirrer.
2. Add propylene glycol monomethyl ether to mixing vessel with agitation and continued to mix.
3. Add glufosinate ammonium technical to mixing vessel with agitation and continue to mix.
4. Add dipropylene glycol to the mixing vessel and continued to mix until the glufosinate ammonium technical was completely solubilized. Continue to mix.
5. Add the sodium xylene sulfonate to mixing vessel while mixing and continue agitation.
6. Add the polymer to mixing vessel while mixing and continue to mix for a minimum of 15 minutes.
7. Package final product for evaluation.

TABLE 1

| Polymer % | Components | Formulation A % by Wt. | Formulation B % by Wt. |
|---|---|---|---|
| | Water | 35.36 | 35.36 |
| | Glufosinate-Ammonium Technical | 25.64 | 25.64 |
| | Sodium Lauryl Ether Sulfate | 24.00 | 24.00 |
| | Dipropylene Glycol | 10.00 | 10.00 |
| | Sodium Xylene Sulfonate | 3.00 | 3.00 |
| | Propylene Glycol Monomethyl Ether | 1.00 | 1.00 |

TABLE 1-continued

| Polymer % | Components | Formulation A % by Wt. | Formulation B % by Wt. |
|---|---|---|---|
| 50 | Acrylic Acid/Maleic Acid Copolymer, MW. 3000 | 1.00 | 0.00 |
| 25 | Acrylic Acid/Maleic Anhydride Copolymer (modified polyacrylamide), MW 20000, | 0.00 | 1.00 |
| 40 | Acrylic Acid/Maleic Acid Copolymer, MW 70000 | 0.00 | 0.00 |
| | Comments | Produced Stable Formulation | Produced Stable Formulation |

TABLE 2

| Polymer % | Components | Formulation C % by Wt. | Formulation D % by Wt. | Formulation E % by Wt. |
|---|---|---|---|---|
| | Water | 35.36 | 35.36 | 35.36 |
| | Glufosinate-Ammonium Technical | 25.64 | 25.64 | 25.64 |
| | Sodium Lauryl Ether Sulfate | 24.00 | 24.00 | 24.00 |
| | Dipropylene Glycol | 10.00 | 10.00 | 10.00 |
| | Sodium Xylene Sulfonate | 3.00 | 3.00 | 3.00 |
| | Propylene Glycol Monomethyl Ether | 1.00 | 1.00 | 1.00 |
| 50 | Modified Polyacrylic Acid Copolymer, MW 4000, | 1.00 | 0.00 | 0.00 |
| 43 | Polyacrylic Acid, (Homopolymer), Na Salt, MW 6000. | 0.00 | 1.00 | 0.00 |
| 45 | Polyacrylic Acid, (Homopolymer) Na salt MW 1200 | 0.00 | 0.00 | 1.00 |
| | Comments | Produced Stable Formulation | Produced Stable Formulation | Produced Stable Formulation |

TABLE 3

| Polymer % | Components | Formulation F % by Wt. | Formulation G % by Wt. |
|---|---|---|---|
| | Water | 35.36 | 35.36 |
| | Glufosinate-Ammonium Technical | 25.64 | 25.64 |
| | Sodium Lauryl Ether Sulfate | 24.00 | 24.00 |
| | Dipropylene Glycol | 10.00 | 10.00 |
| | Sodium Xylene Sulfonate | 3.00 | 3.00 |
| | Propylene Glycol Monomethyl Ether | 1.00 | 1.00 |
| 45 | Polyacrylic Acid, Na salt (Homopolymer), MW 2500 | 1.00 | 0.00 |
| 35 | Polyacrylic Acid, Na salt (Homopolymer), MW 15000 | 0.00 | 1.00 |
| 49 | Polyacrylic Acid, (Homopolymer), MW 5000 | 0.00 | 0.00 |
| | Comments | Produced Stable Formulation | Produced Stable Formulation |

As illustrated in the above Tables 1-3, herbicidal compositions for in accordance with the subject application demonstrated a stable glufosinate soluble liquid formulation without alkyl polygluoside surfactants as illustrated by examples A, B, C, D, E, F and G.

It is to be understood that the appended claims are not limited to express and particular compounds, surface treatment materials, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the subject application independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the subject application, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention has been described in an illustrative manner, and it is to be understood that the terminology which has been used is intended to be in the nature of words of description rather than of limitation. Obviously, many modifications and variations of the subject application are possible in light of the above teachings. The invention may be practiced otherwise than as specifically described.

What is claimed is:

1. A stable liquid herbicidal composition free of alkyl polyglucoside, the liquid herbicidal composition comprising:
   glufosinate, or a salt thereof;
   an alkyl ether sulfate, or a salt thereof, wherein the alkyl ether sulfate is according to the average formula (I): R—(OCH$_2$CH$_2$)$_n$—OSO$_4$(I), wherein R is linear or branched alkyl group having from 8 to 18 carbon atoms and wherein the subscript n ranges from 1 to 10;
   a hydrotrope;
   a polycarboxylate having a weight average molecular weight ranging from greater than or equal to 1,000 g/mol to less than 70,000 g/mol; and
   water.

2. The liquid herbicidal composition according to claim 1, wherein a salt comprising said salt of glufosinate is selected from the group consisting of ammonium, sodium, potassium, alkyl amine, and combinations thereof.

3. The liquid herbicidal composition according to claim 1, wherein said salt of glufosinate comprises glufosinate ammonium.

4. The liquid herbicidal composition according to claim 1, wherein said glufosinate, or said salt thereof, comprises from 10 to 30 weight percent of the total weight of the herbicidal composition.

5. The liquid herbicidal composition according to claim 1, wherein said polycarboxylate comprises a polymer of (meth)acrylic acid, a copolymer of (meth)acrylic acid and maleic acid, a copolymer of (meth)acrylic acid and maleic anhydride, or a copolymer of (meth)acrylic acid and maleic acid and maleic anhydride.

6. The liquid herbicidal composition according to claim 5, wherein said copolymer of (meth)acrylic acid and maleic acid, or said copolymer of (meth)acrylic acid and maleic anhydride, or said copolymer of (meth)acrylic acid and maleic acid and maleic anhydride has a weight average molecular weight ranging from 3,000 to 6,000.

7. The liquid herbicidal composition according to claim 6, wherein said copolymer further comprises an additional polymer having carboxylic side moieties.

8. The liquid herbicidal composition according to claim 7, wherein the carboxylic side moieties comprise an acid, a salt, a condensed anhydride, and combinations thereof.

9. The liquid herbicidal composition according to claim 1, wherein said polycarboxylate comprises from 0.1 to 3.0 weight percent of the total weight of the herbicidal composition.

10. The liquid herbicidal component according to claim 1, wherein the hydrotrope comprises aryl sulfonic acid or a salt thereof.

11. The liquid herbicidal composition according to claim 10, wherein said aryl sulfonic acid or a salt thereof is selected from the group consisting of xylene sulfonic acid or a salt thereof, toluene sulfonic acid or a salt thereof, cumene sulfonic acid or a salt thereof, benzene sulfonic acid or a salt thereof, and mixtures thereof.

12. The liquid herbicidal composition according to claim 1, wherein the hydrotrope comprises sodium xylene sulfonate.

13. The liquid herbicidal composition according to claim 1, wherein said hydrotrope comprises from 1.0 to 10 weight percent of the total weight of the herbicidal composition.

14. The liquid herbicidal composition according to claim 1, wherein said salt of said alkyl ether sulfate comprises sodium or potassium.

15. The liquid herbicidal composition according to claim 1, wherein the alkyl ether sulfate, or a salt thereof comprises sodium lauryl ether sulfate.

16. The liquid herbicidal composition according to claim 1, wherein said alkyl ether sulfate, or a salt thereof comprises from 20 to 30 weight percent of the total weight of the herbicidal composition.

17. The liquid herbicidal composition according to claim 1, wherein water is present in an amount ranging from 10 to 60 weight percent of the total weight of the herbicidal composition.

18. The liquid herbicidal composition according to claim 1, further comprising at least one glycol present in an amount ranging from 0.1 to 18 weight percent of the total weight of the herbicidal composition.

19. The liquid herbicidal composition according to claim 18, wherein said glycol comprises an alkylene glycol monoalkyldialkyl ether present in an amount ranging from 0.1 to 3 weight percent of the total weight of the herbicidal composition.

20. The liquid herbicidal composition according to claim 18, wherein said glycol comprises dipropylene glycol present in an amount ranging from 0.1 to 3 weight percent of the total weight of the herbicidal composition.

* * * * *